Oct. 13, 1942.          H. W. KOST          2,298,568
SHEET METAL FASTENER
Filed Nov. 7, 1941

Harold W. Kost
INVENTOR.

BY Malcolm W. Fraser
ATTORNEY

Patented Oct. 13, 1942

2,298,568

UNITED STATES PATENT OFFICE 2,298,568

SHEET METAL FASTENER

Harold W. Kost, Birmingham, Mich., assignor to Detroit Harvester Company, Detroit, Mich., a corporation of Michigan Application November 7, 1941, Serial No. 418,155

3 Claims. (Cl. 85—36)

This invention relates to sheet metal fasteners but more particularly to nuts of the so-called C type having a pair of arms extending in the same general direction, and an object is to provide a nut of this character with a new and improved device for positioning the nut on a supporting panel properly for the reception of a screw or the like and retaining the same in place until the screw is applied, such device being an integral part of the nut and facilitating the application of the nut and being inexpensive to produce.

Other objects and advantages of the invention will hereinafter appear and for purposes of illustration but not of limitation, an embodiment of the invention is shown on the accompanying drawing in which—

Figure 1:
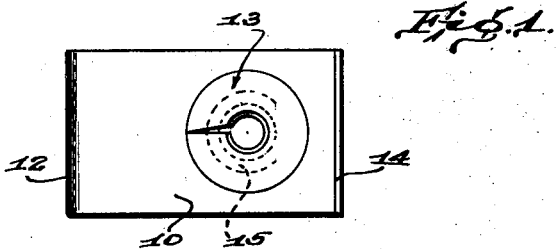
Figure 1 is a top plan view of the fastener.

The illustrated embodiment of the invention comprises a one-piece sheet metal nut having an upper arm 10 and a lower arm 11 which are integrally connected at one end by a curved web 12, the two arms extending in the same general direction and the upper arm having an integral deformed screw-thread engaging portion 13 commonly known as a "Prestole." The form and construction of the Prestole is well-known to those skilled in the art so that detail description and illustration thereof is not considered necessary, it being considered sufficient to refer to the patent to Harold W. Kost No. 2,169,182, dated August 8, 1939, wherein full description and illustration thereof is given. The free end of the arm 10 curves upwardly as indicated at 14 to facilitate the application of the fastener clip to the supporting panel as will hereinafter appear.

Struck from the lower arm 11 is a lip 15 which is substantially disc-like. The lip 15 is annular except for its integral connection with the arm 11, such integral connection being near the free end of that arm and the lip inclining outwardly away from the inner surface of the arm 11 and extending generally in the direction of the integral web connection 12. The inherent resilience of the sheet metal from which the fastener is formed, causes the lip 15, after being depressed toward the plane of the arm 11 and then released, to return to its outwardly inclined position.

Formed in the lip 15 is an aperture 16 which is adapted to align substantially with the screw-threaded opening in the screw thread receiving portion 13 of the arm 10.

Figure 2:
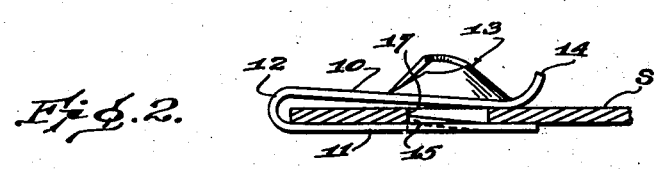
Figure 2 is a side elevational view of the fastener applied to a supporting panel.
Figure 3:
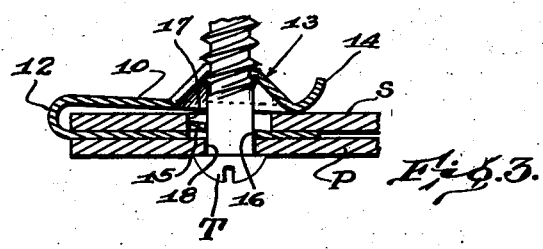
Figure 3 is a sectional view of the fastener applied to a supporting panel and showing a screw securing a second panel in assembled relation.
Figure 4:
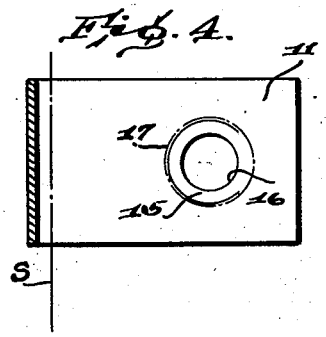
Figure 4 is a sectional view showing the lower arm of the fastener.

In use the fastener is slipped over the free edge of a supporting panel S which is provided with an aperture 17 adapted to receive a screw. The dimensions of the fastener are so chosen with respect to the location of the aperture 17 that when the clip is slipped into position as indicated in Figure 2, the lip 15 will snap into the opening 17 and abut against an edge wall thereof, thereby militating against retrograde movement of the fastener and maintaining the fastener or clip in the proper position for the reception of the screw or the like. It will be apparent that in the application of the clip, the lip 15 will be depressed to lie substantially flush with the surface of the arm 11 and in view of the direction in which it extends, it facilitates the application of the fastener to the supporting panel S. It will be manifest that since the lip impinges against an edge wall of the panel aperture 17, it will be held securely in position and can not readily be removed from the panel without depressing the lip to free it from engagement with the edge wall of the aperture 17. Preferably the contour of the lip 15 is so chosen that it will have substantial contact with the edge wall of the aperture so as to insure that the fastener will remain in position.

After the fastener is applied to the supporting panel S, the panel P may be positioned against the outer side of the arm 11 and a screw T may be inserted through the opening 18 in the panel P, through the opening 16 in the lip 15, through the aperture 17 of the panel S and into screw-threaded engagement with the portion 13 thereby securely clamping the parts together. It will be seen that the locating lip 15 does not in any way interfere with the application of the screw T, its primary function being initially to locate and retain the clip in position preparatory to the reception of the screw.

Numerous changes in details of construction, arrangement and operation may be effected without departing from the spirit of the invention especially as defined in the appended claims.

What I claim is:

1. A clip for attachment to a supporting panel having an aperture for receiving the shank of a fastener, said clip comprising a pair of arms having portions extending in the same general direction for engaging opposed surfaces of the supporting panel, a shank engaging portion on one arm, and a flexible apertured lip integral with the other arm and having a free end portion severed from and normally inclined out of the plane of the respective arm toward the adjacent surface of the supporting panel, said lip being yieldable and of a size to enter the aperture of the supporting panel and abut against an edge thereof when released from pressure for retaining the clip in position on the panel.

2. A clip for attachment to a supporting panel having an aperture for receiving the shank of a fastener, said clip comprising a pair of arms having portions extending in the same general direction for engaging opposed surfaces of the supporting panel, a shank engaging portion on one arm, and a lip struck from the other arm except for an integral connection with such arm enabling flexing of the lip relatively thereto, said lip substantially conforming to the contour of the wall of the panel aperture, said lip having an aperture through which the fastener shank is adapted to pass and being normally flexed away from such arm toward the panel to engage in the panel aperture upon release of pressure thereagainst for holding the clip in place.

3. A clip for attachment to a supporting panel having an aperture for receiving the shank of a fastener, said clip comprising a pair of arms having portions extending in the same general direction for engaging opposed surfaces of the supporting panel, an integral connection between said arms, a screw thread engaging portion on one arm, a disc-like flexible lip struck from and inclining away from the other arm and extending toward said integral connection, said lip having an aperture to receive the fastener shank and being adapted normally to engage in the panel aperture for positioning the clip on the panel when relieved from pressure.

HAROLD W. KOST.